March 12, 1968 S. E. TOWNSEND 3,373,377

SELF-ADJUSTING VARIABLE FREQUENCY SAWTOOTH GENERATOR

Filed July 1, 1966 2 Sheets-Sheet 1

INVENTOR.
STEPHEN E. TOWNSEND

BY Anthony J. Cennamo
Paul W. Fish

ATTORNEYS

March 12, 1968 S. E. TOWNSEND 3,373,377
SELF-ADJUSTING VARIABLE FREQUENCY SAWTOOTH GENERATOR
Filed July 1, 1966 2 Sheets-Sheet 2

INVENTOR.
STEPHEN E. TOWNSEND
BY
ATTORNEYS 3,373,377
SELF-ADJUSTING VARIABLE FREQUENCY SAWTOOTH GENERATOR

Stephen E. Townsend, Rochester, N.Y., assignor to Xerox Corporation, Rochester, N.Y., a corporation of New York Filed July 1, 1966, Ser. No. 562,290
8 Claims. (Cl. 331—111)

ABSTRACT OF THE DISCLOSURE

A variable frequency sawtooth waveform generator independent of frequency over a relatively wide range. An amplitude to pulse width converter for determining the magnitude of a feedback control signal to be applied to a constant current generator is utilized in conjunction with variable frequency constant amplitude sawtooth waveform generators.

*Background*

The use of sawtooth or ramp waveforms in measuring and testing apparatus, as well as electronic display apparatus, is well known in the art. In such ramp waveform generating circuits the desired linearly varying portion of the sweep is generally accomplished by charging and/or discharging a capacitor at an approximately constant rate. As is known a sawtooth waveform may be generated in accordance with prior art teaching by charging a capacitor at a constant rate over finite time period and subsequentially discharging the capacitor during a short period of time in comparison to the charging interval. The output voltage is customarily taken across the capacitor and has the waveform of a sawtooth. If the charging current for the capacitor is held constant the voltage to which the capacitor is charged and hence the sawtooth output voltage will be directly proportional to the charging time interval. Thus the peak to peak voltage across the capacitor and hence the amplitude of the sawtooth output waveform is directly proportional to the charging time interval.

The prior art further teaches the use of a trigger or switching mechanism for controlling the discharging at the capacitor during the reset or flyback time. The switching or trigger mechanism may be actuated by a source of triggering pulses. In such a case the capacitor may be charged from a constant current source during the period between triggering pulses and the charge thus accumulated may be discharged through an auxiliary circuit rendered conductive by the triggering pulses. In this manner the frequency and amplitude of the sawtooth wave generated is dependent upon the frequency or pulse repetition rate of the triggering pulse source. As is known the charging time interval determines the peak to peak voltage on the capacitor and thus the amplitude of the sawtooth waveform. If the pulse repetition frequency of the triggering pulses decreases, the charging interval is thus increased thereby allowing the capacitor to charge to a higher value. Similarly an increase in the pulse repetition frequency of the triggering pulses results in a shorter charging time for the capacitor and thus results in the generation of a lower amplitude sawtooth waveform.

Many applications in the measuring and testing art require generation of variable frequency, constant amplitude timing waveforms, for example, sawtooth waveforms. Prior art attempts to solve this problem have involved either the use of separate waveform generating circuits or the use of costly specially made circuit components. Neither the use of individual generating circuits nor the use of costly specially made components is entirely satisfactory for both unnecessarily add to the cost and complexity of the generating circuits.

*Objects*

Accordingly, it is an object of the present invention to provide an improved variable frequency sawtooth generator.

It is another object of the present invention to provide an improved variable frequency, constant amplitude sawtooth generator employing standard components.

It is yet another object of the present invention to provide novel circuit means for generating recurring sawtooth waveform of constant amplitude independent of frequency over a relatively wide range.

It is yet a further object of the present invention to provide a compensated, transistorized constant amplitude variable frequency sawtooth waveform generator of improved design.

*Brief summary of the invention*

In accomplishing the above and other desirable objects, applicant has invented an improved variable frequency sawtooth waveform generator including an amplitude to pulse width converter for determining the magnitude of a feedback control signal to be applied to the constant current generator. A timing capacitor is arranged to be selectively reset to a preset condition in response to periodic triggering pulses. Thereafter the capacitor is charged through the constant current source toward a constant predetermined amplitude. The amplitude of the ramp waveform is continuously monitored to determine the time interval between the occurrence of the predetermined maximum waveform amplitude and the reset time. The amplitude to pulse width conversion selectively controls through the feedback loop the bias applied to and thus the current level from the constant current source. In this manner the current level from the constant current source magnitude and thus the slope of the ramp wave generator is controlled such that the end point of the ramp is automatically adjusted to obtain the proper slope corresponding to the pulse repetition frequency of the triggering signal.

*Decsription of the drawings*

For a more complete understanding of applicant's invention and various embodiments thereof, reference may be had to the following detailed description in conjunction with the drawings wherein.

Figure 4:
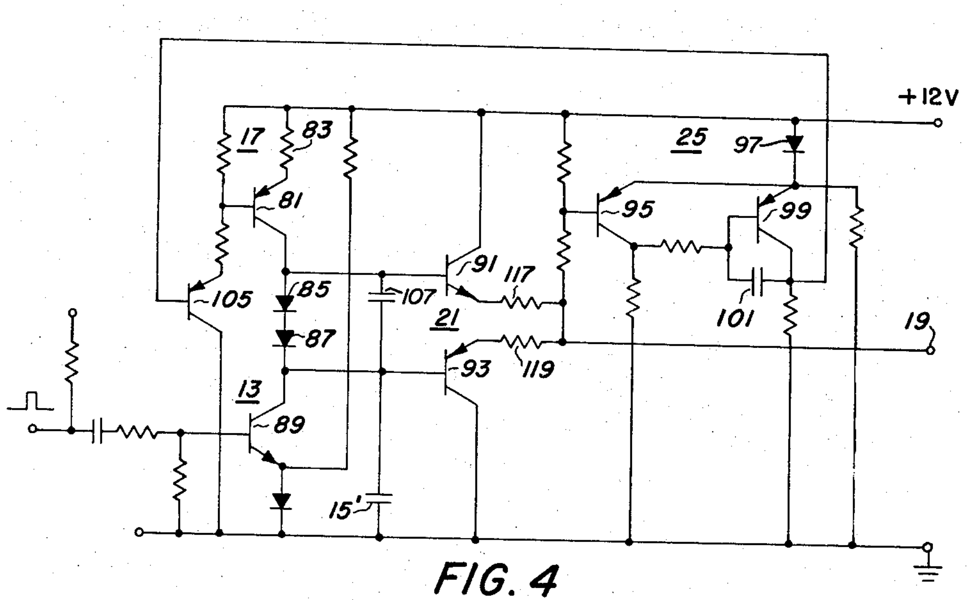
FIG. 4 is a schematic diagram of another embodiment of a self-adjusting sawtooth generator in accordance with the principles of the present invention.

FIGS. 5*a*, 5*b*, 5*c*, 5*d*, and 5*e* illustrate various partial schematics and associated waveforms useful in understanding one aspect of the linearity compensated self-adjusting sawtooth generator illustrated in FIG. 4.

*Detailed description of the invention*

Figure 1:
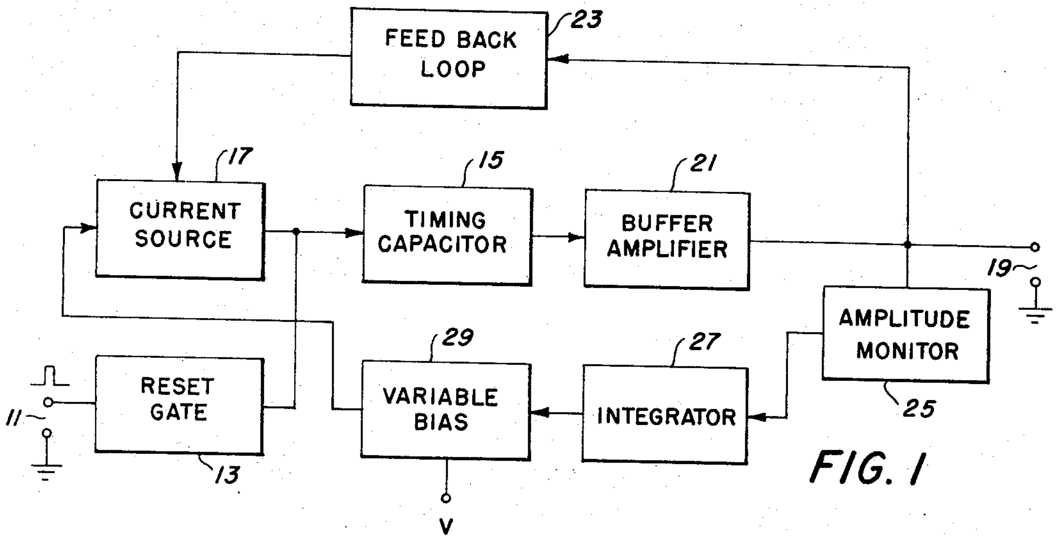
FIG. 1 is a block diagram of a constant amplitude, variable frequency sawtooth generator in accordance with the principles of the present invention.

Referring now to FIG. 1 there is shown a block diagram of a self-adjusting sawtooth waveform generator in accordance with the principles of the present invention. Input pulses coupled to terminal 11 actuate reset gate 13 thereby clamping or resetting timing capacitor 15 to a reference level. After the termination of the reset pulse, the timing capacitor 15 is charged by current from constant current source 17 toward a predetermined maximum amplitude level. Whether the capacitor is "charged" or "discharged" depends upon the reference potential to which the other plate of the capacitor is returned while the constant current source is on. Thus when used hereinafter no attempt is made to characterize the potential relative to a response potential but it is used in a general sense of the linear and reset times respectively. In order to isolate the ramp generating capacitor 15 from a utilization load device coupled to output terminal 19 and to prevent the diversion of substantial portion of the charging current thereto buffer amplifier 21 is coupled between the timing capacitor 15 and the output terminal 19. Thus, in response to each triggering pulse to input terminal 11, a ramp waveform appears at the output terminal 19.

To maintain the charging current from the constant current source 17 substantially equal during each ramp period in spite of, for example, increasing leakage current in the constant current source, a linearizing feedback circuit 23 comprising, for example, a resistor couples a portion of the output from buffer amplifier 21 to a control input of the constant current source 17. In this manner the linearizing feedback resistor will compensate for any non-linearities in the constant current source and maintain the charging current substantially constant over the entire ramp duration.

In accordance with one aspect of the present invention, a second feedback loop including amplitude monitor circuit 25, integrator 27 and variable bias 29 develops a second feedback signal for controlling the operation of the constant current source as a function of the pulse repetition rate of the triggering signal. In amplitude monitor circuit 25 periodic pulse-width modulated signals are generated in response to the detection of the maximum amplitude relative to the reset time. In this manner a signal proportional to the error in the slope of the ramp generator and thus the current level from the constant current source is generated. The output from amplitude monitor circuit 25 is coupled to integrator circuit 27 wherein the error signal for each cycle of the sawtooth generator is integrated thereby generating a composite or average error signal. The output from integrator circuit 27 is coupled to the input of variable bias circuit 29. From the output of variable bias circuit 29 a feedback bias signal proportional to the integrated frequency-slope error detected in the ramp generator is coupled to a control input of the constant current source. In this manner the slope, as will hereinafter be more fully explained, is adjusted to the proper level thereby insuring the generation of a constant amplitude sawtooth in response to various pulse repetition frequencies of the input trigger pulse.

Figure 2:
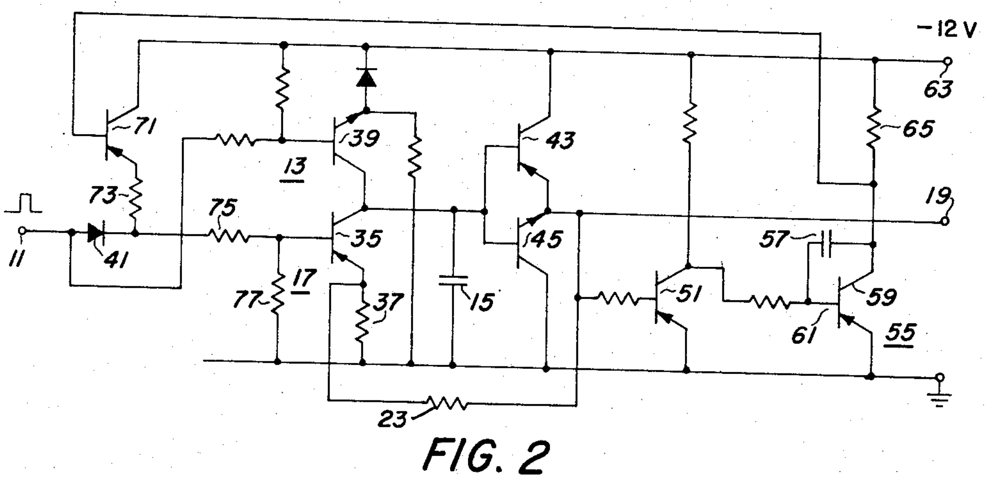
FIG. 2 is a schematice diagram of one embodiment of a self-adjusting sawtooth generator in accordance with the principles of the present invention.

Referring now to FIG. 2 there is shown a schematic diagram of one embodiment of the self-adjusting sawtooth generator in accordance with one aspect of the present invention. For convenience like numerals are employed to designate similar parts in the block diagram of FIG. 1 and the schematic diagram of FIG. 2. As shown, the ramp circuit includes capacitor 15 and transistor 35 arranged to charge the capacitor through the high impedance collector circuit. Resistor 37 is coupled in the emitter circuit of transistor 35 thereby insuring constant current operation. Transistor 39 is arranged as a reset gate and as shown includes a transistor of opposite conductivity for supressing or overriding the effect of transistor 35 in response to an input pulse coupled to terminal 11. With diode 41 coupled to the input terminal and poled as shown, the constant current transistor 35 is rendered non-conductive during the reset pulse time period. Thus in response to each input pulse, the charge on capacitor 15 will be discharged or reset to a predetermined level, for example, the minus 12 volt supply through the operation of transistor 39.

Upon the termination of the reset pulse, transistor 39 is rendered non-conductive and transistor 35 rendered conductive thereby initiating the linear sweep portion of the ramp generator through the action of the constant current source. Complementary transistors 43 and 45 are coupled to the timing capacitor and function to isolate the timing capacitor from load coupled to output terminal 19. To facilitate the adjustment of the constant current source to insure linearity during each ramp portion, linearizing feedback resistor 23 is coupled between the output terminals 19 and the junction of the emitter electrode of transistor 35 and resistor 37.

Figure 3:
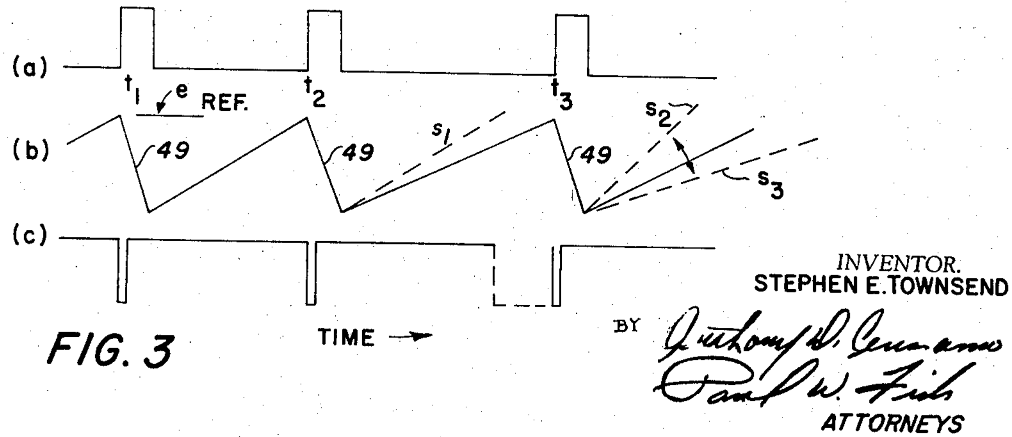
FIG. 3 illustrates a series of idealized voltage-time waveforms useful in understanding the operation of the self-adjusting sawtooth generator illustrated in FIGS. 2 and 4.

Referring now to FIGS. 2 and 3 the operation of the self-adjusting feedback loop for assuring constant amplitude will now be explained. As shown in FIG. 3*a* a plurality of input pulses are successively applied to the input terminal at times $t_1$, $t_2$, and $t_3$ respectively. As hereinbefore explained is response to each input pulse the charge on capacitor 15 is discharged and reset to a reference level as shown by a flyback portion 49 of waveform B. Transistor 51 of the self-adjusting feedback loop is arranged to respond to the occurrence of a predetermined level in the sawtooth waveform. When the output signal at the emitters of the buffer amplifier transistors 43 and 45 reaches the terminal or end point of the ramp, i.e., ground, transistor 51 is rendered non-conductive as the emitter electrode is coupled directly to the reference potential, for example, ground. In response to the ramp waveform approaching the predetermined reference potential the emitter-base junction of transistor 51 becomes back biased thereby turning off the transistor. As shown in FIG. 3*c* when the slope is properly adjusted a narrow spike appears at the collector of transistor 51 each time the ramp amplitude reaches the reference level. This signal is coupled to the base of transistor 55 thereby rendering transistor 55 momentarily conductive. Transistor 55 functions as a combined amplifier and integrator with capacitor 57 coupled between the collector and base electrodes 59 and 61 respectively. In this manner the pulse width modulated error signals are integrated thereby smoothing out the operation in the feedback error signal. The collector of transistor 55 is coupled to the source of collector bias coupled to terminal 63 through resistor 65. The junction of the integrating capacitor 57, the collector electrode 59, and the collector resistor 65 forms a feedback junction from which a signal is coupled to the base electrode of transistor 71. The emitter electrode of transistor 71 is coupled through a voltage divider including resistors 73, 75 and 77 to the base electrode of constant current source transistor 35.

Referring again to FIG. 3 in conjunction with the schematic in FIG. 2 the detailed operation of the self-adjusting constant amplitude features of the present invention will now be explained. As is known the slope of the linear portion of the ramp waveform may be controlled by controlling the amplitude of the current from the constant current source. As shown in FIG. 3*b* the dotted portions $S_1$, $S_2$, and $S_3$ indicate various slopes which may be generated by varying the amplitude of the current from the constant current source. As hereinbefore described the output of transistor 51 as shown in FIG. 3*c* is a pulse width modulated signal corresponding to the error in the ramp slope for the particular pulse repetition frequency of the input signal. With a decrease in pulse repetition frequency as illustrated between pulses at $t_2$ and $t_3$ relative to $t_1$ and $t_2$, the slope of the waveform $S_1$ is too great and therefore reaches the reference level too soon. As shown in the corresponding time in FIG. 3*c* the output pulse of transistor 51 becomes wider, i.e., begins as soon as the ramp reaches the predetermined level and thus the average DC level becomes more negative. In response to this more negative error signal the control signal fed back via the feedback loop to the base of transistor 71 is correspondingly more positive. With the more positive feedback signal coupled to the base electrode of transistor 71, the input to the base of constant current of transistor 35 is correspondingly more positive through the operation of the emitter follower voltage divider resistors 73, 75 and 77. When the error feedback signal and thus the base electrode of transistor 35 becomes more positive, less base current is supplied to the base of transistor 35 during the linear portion of the sawtooth waveform.

As is known the decrease in base current into the constant current transistor 35 results in a lower magnitude of current from the constant current source thereby lowering the slope until it approaches the proper level for the particular pulse repetition frequency. Thus through the action of the automatic feedback loop, the slope of the sawtooth waveform is lowered until the pulse from transistor 51 is again quite narrow as it is in the normal operating condition when the ramp reaches the reference level at flyback time. In this manner a decrease in pulse repetition frequency of pulses coupled to the input terminal 11 automatically decreases the current from the constant current source thereby allowing the ramp to linearly increase at a lower rate, i.e., decrease the slope until the proper slope insuring the generation of a fixed amplitude sawtooth is reached. Conversely for an increase in pulse repetition frequency a correspondingly narrower pulse would be coupled from the collector electrode of transistor 51 to the feedback loop thereby varying the bias signal to increase the current level out of the transistor 35 until the proper slope for the pulse repetition frequency within the adjustable range is automatically generated.

Referring now to FIG. 4 there is shown a schematic diagram of another embodiment of a self-adjusting constant amplitude sawtooth generator in accordance with another aspect of the present invention. In this embodiment the timing capacitor 15' is arranged to be charged through the constant current source 17 including transistor 81 having resistor 83 in its emitter circuit and diodes 85 and 87 in its collector circuit. Transistor 89 being arranged as a reset gate 13 provides a discharge path for timing capacitor 15' when rendered conductive in response to an input signal coupled to input terminal 11. The output ramp waveform is coupled from capacitor 15' through the buffer amplifier 21 including complementary transistors 91 and 93 to the output terminal 19.

As hereinbefore described in conjunction with FIG. 2 a pulse width modulated error signal is automatically generated in amplitude monitor 25 and feedback to control the charging rate and thus the slope of the ramp generator. As shown transistor 95 is arranged to be rendered conductive whenever the waveform at output terminal 19 reaches a predetermined amplitude level. In this embodiment the level is determined by the drop across diode 97 which is common to the emitter circuits of transistors 95 and 99. In response to the detection of the predetermined level in the output waveform transistor 95 is rendered non-conductive thereby generating at the collection electrode a pulse similar to that shown in FIG. 3*c*. This pulse is coupled to the base electrode of transistor 99 which comprises the integrator-buffer of the automatic amplitude control feedback loop. In a manner hereinbefore described in conjunction with FIG. 2 the duration of the pulse coupled to the base of transistor 99 generates an error signal proportional to the deviation or slope-error of ramp generator for the particular pulse repetition frequency applied to the input terminal. Capacitor 101 which is coupled between the collector and base electrodes of transistor 99 averages or integrates the pulse width modulated error signals from transistor 95 thereby generating an appropriate feedback bias signal intermediate the most positive bias supply and reference level. This bias signal is coupled to the base electrode of control transistor 105. Control transistor 105 is arranged in an emitter follower configuration and generates a control bias signal for the base electrode of constant current transistor 81 which is proportional to the detected slope error signal from the amplitude frequency detector 25. In this manner the amplitude stabilizing feedback loop generates a control bias signal for varying the current curve from constant current transistor 81 thereby varying the charging rate and thus the slope of the ramp generator.

As shown in FIGS. 2 and 4 the buffer amplifier 21 comprises a pair of opposite conductivity transistors having their emitters coupled to the output terminal. The use of the opposite conductivity pair in the buffer amplifier is desirable to facilitate compatibility with various loads. In the embodiment shown in FIG. 4 the NPN transistor would not be required if the load is to be returned to plus 12 volts supply. However, the inclusion of the opposite conductivity pair in either embodiment facilitates the operation of the circuit especially for driving resistive load. The use of the opposite conductivity pair while desirable for driving resistive loads does present additional problems in that the base electrodes and emitter electrodes of the opposite conductivity pair are respectively coupled to the same point.

Figures 5B, 5E:
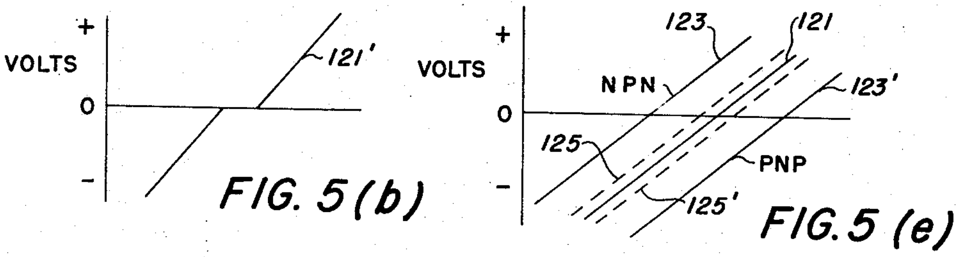
Figure 5A:
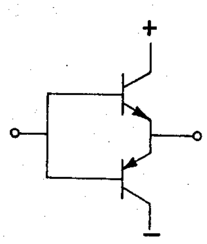
PRIOR ART FIG. 5(a)

In the opposite conductivity pair configuration, as shown in FIG. 5*a* depending upon the polarity of the excursion of the input signal coupled to the base electrodes the respective NPN or PNP transistor will not conduct until the excursion exceeds the emitter-base levels by the junction potential drop. Such potential drops would be evident in the output signal as discontinuities or jumps in the output signal as shown in FIG. 5*b*.

Figure 5D:
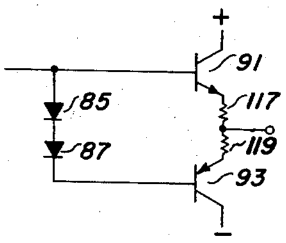
Figure 5C:
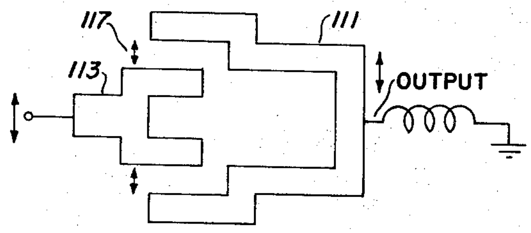

The problem is further illustrated in FIG. 5*c* by means of a mechanical analogy. As shown the biased output member 111 is arranged to be selectively displaced, as shown by the double-headed arrow, in response to the movement of the input member 113. From the rest position as shown the output member will follow the input member after the input member has moved a distance 117 corresponding to the slack or dead space. This slack or dead space results from the initial positioning of the output and input members 111 and 115 respectively and would correspond to the junction drops of the opposite conductivity transistor pair.

In order to maintain the desired degree of linearity in the output waveform the respective junction drops or jumps due to the opposite conductivity pair being tied in parallel is compensated for in accordance with another aspect of the present invention by maintaining the respective emitter and base electrodes at predetermined potential level differences. FIG. 5*d* illustrates the buffer amplifier as shown in FIG. 4. As hereinabove described the collector electrode of constant current source transistor 81 is coupled in series with a pair of similarly poled diodes 85 and 87. In operation the diodes 85 and 87 are poled to normally conduct current in the forward mode and thus the base electrodes of transistors 91 and 93 are held at different potential levels corresponding to the sum of the forward drops of diodes 85 and 87. As shown the base electrode of transistor 91 would be held more positive than the base electrode of transistor 93 in an amount equal to the forward drop across the diodes 85 and 87. Filter capacitor 107 is coupled in shunt with the diode 85 and 87 thus maintaining the filtered potential differential across the respective base electrodes.

The operation of the improved, opposite conductivity pair buffer amplifier in accordance with one aspect of the present invention is graphically illustrated in FIG. 5*c*. As hereinabove described in conjunction with FIGS. 4 and 5*d*, the base-emitter electrodes of the opposite conductivity transistor pair are held at predetermined potential level differences. As shown in FIG. 5*e*, the output curve 121 is bracketed by a pair of similar base and emitter curves 123 and 125 respectively. As hereinbefore described the base electrodes of transistors 91 and 93 are respectively held more positive and more negative than the output curve 121 by the action of the forward biased diodes 85 and 87 and the transistor junction drops. The action of the emitter resistors 117 and 119, which for example may comprise ten ohm resistors is to compensate for variations or dissimilarity between the junction drops of diodes 85, 87 and the respective base emitter junction drops. In this manner the respective base emitter junctions may be held at predetermined potential level differences to maintain the respective base emitter junctions forward biased direction. With both emitter base junctions forward biased, both transistors of the opposite conductivity pair are maintained conductive and thus the step or discontinuity as shown in FIG. *5b* is eliminated in output curve 121.

In the foregoing there has been described various embodiments of novel circuit apparatus for maintaining a linear constant amplitude sawtooth waveform over a wide range of pulse repetition frequencies. As would be evident to those skilled in the art many modifications may be made in the arrangement and values of the various circuit components and parameters without departing from the scope of the present invention. Thus the foregoing drawings and description are to be understood to be illustrative and in no sense limiting. It is therefore applicant's intention to be limited only as indicated by the scope of the following claims.

What is claimed is:

1. A triggerable sawtooth waveform generator comprising:

a ramp waveform generator including
- a constant current source and
- a timing capacitor, reset gating means for clamping said timing capacitor to a predetermined level in response to an input control signal, buffer amplifier means for coupling the waveform generated by said timing capacitor to an output terminal, amplitude monitor means for monitoring the waveform coupled by said buffer amplifier means to said output terminal means, and variable feedback means responsive to said amplitude monitor means for varying a bias signal coupled to said constant current source.

2. A variable frequency constant amplitude triggerable sawtooth waveform generator comprising ramp waveform generating means including
- a constant current source and
- a timing capacitor, reset gating means for clamping said timing capacitor to a predetermined potential level in response to an input signal, buffer amplifier means for coupling the waveform generated at said timing capacitor to an output terminal, monitor means for generating a variable width pulse proportional to the pulse repetition frequency of said input control signal, and feedback means responsive to said variable width pulse for varying a bias signal coupled to said constant current source.

3. The waveform generator defined in claim 2 wherein said monitor means comprises a normally conductive transistor amplifier having a base, emitter and collector electrode and means for coupling the output of said buffer amplifier to said base electrode and wherein the width of the variable width pulse is inversely proportional to changes in the pulse repetition frequency of said input signal.

4. The waveform generator defined in claim 2 wherein said buffer amplifier comprises a pair of opposite conductivity transistor amplifiers arranged in an emitter follower configuration.

5. The waveform generator defined in claim 1 additionally including diode means for selectively rendering the constant current source non-conductive during the time interval the reset gating means is operative.

6. The waveform generator defined in claim 1 wherein said amplitude monitor means includes transistor amplifier means for generating a pulse width modulated signal proportional to the pulse repetition frequency of a control pulse coupled to said reset gating means and wherein said feedback means includes integrator means for integrating the pulse width modulated signals emanating from said transistor amplifier means.

7. The waveform generator defined in claim 1 wherein said buffer amplifier comprises a pair of opposite conductivity transistors each having a base, emitter and a collector electrode and each being arranged in an emitter follower configuration and additionally including compensating means for eliminating non-linearities in the output waveform occasioned by the conduction state of the respective ones of said opposite conductivity transistors.

8. The waveform generator defined in claim 7 wherein said compensating means includes diode means for maintaining the base electrodes of said opposite conductivity transistor pair at predetermined potential differences relative to the signal level on said timing capacitor, and resistive means coupled in the emtter circuit of said opposite conductivity transistor pair for maintaining the emitter electrodes at predetermined potential differences whereby the respective transistors of the opposite conductivity pair are always conductive in variable degrees.

No references cited.

JOHN KOMINSKI, *Primary Examiner.*